United States Patent Office 3,359,705
Patented Dec. 26, 1967

3,359,705
OXYGEN PERMEABLE MEMBRANES
Joseph T. Mullhaupt, Tonawanda, N.Y., assignor to Union Carbide Corporation, a corporation of New York
No Drawing. Filed Oct. 27, 1966, Ser. No. 589,848
7 Claims. (Cl. 55—16)

The present invention relates in general to air separation and more particularly to novel metallic membranes suitable for separating oxygen from air by preferential permeation of oxygen therethrough.

Generally speaking, there are four types of processes known in the art for isolating oxygen from nitrogen and the other gases with which it is found in admixture in the atmosphere. By far the most widely used for commercial scale purposes is that process involving liquefication of air and subsequent fractionation of the liquid based on differences in the boiling points of the elements present. A second method is based on a reversible chemical reaction wherein an element or compound selectively combines with oxygen in the atmosphere and under a different set of physical conditions, i.e., temperature and/or pressure, the oxidized product is decomposed to yield oxygen and the original reactant. Electrolysis of an appropriate oxygen-containing compound such as $H_2O$ is a well-known procedure.

It has also been proposed to isolate oxygen from the atmosphere by utilizing the unique ability of oxygen to permeate thin films of silver to the substantial exclusion of all other gases normally present with oxygen in air. Such a method is described in Italian Patent No. 526,034, granted May 19, 1955 to Lorenzo Tortolina, and numerous studies of the selective affinity of silver for oxygen have been reported in the literature, e.g., Johnson, F.M.G. and P. Larose, J. Am. Chem. Soc. 46 1377 (1924).

As is reported in the aforesaid Tortolina patent, at elevated temperatures of the order of 400 to 600° C. solid silver acts as a porous substance toward oxygen and when air at this temperature (and preferably at superatmospheric pressures) is brought into contact with one surface of a thin silver film, the oxygen which diffuses therethrough can be collected from the opposite surface by desorption. To be economically suitable for the large commercial scale production of oxygen, however, it is essential that rate of permeation of oxygen through the silver barrier by very rapid. Perhaps two principal factors which affect the rate of permeation are (a) the thickness of the silver membrane, and (b) the temperature of the system. The thinner the membrane and the higher the temperature of the system the greater the rate of permeation.

Unfortunately the technological problems involved with fabricating and operating silver film permeation process with an adequate correlation of permeate thickness and temperature to achieve commercially realistic oxygen production rtaes have heretofore been practically insoluble. Even at temperatures of about 600° C., silver film thicknesses of not more than about 1000 A. are desirable. At more modest temperatures, even thinner film are required. When it is considered that the permeator film must also be free of holes or pores which will permit the passage through of nitrogen or gas other than oxygen, be capable of large-scale fabrication at reasonable cost, and possess a satisfactory operational "lifetime," it becomes more apparent why silver film permeation process for producing oxygen have so far failed to attain industrial importance.

If it be assumed that some suitable technique be found to prepare continuous, i.e., hole-free, silver permeation films of the required thinness, the problems have still not all been solved. The necessary temperatures involved in operation have been found to quickly disrupt or otherwise change the character of such silver films so that they are no longer selective in their transfer toward oxygen. Aside from the obvious damage attributable to mechanical rending of these delicate films due to expansion and contraction occasioned by temperature fluctuations, other "transformations" have been observed for which there is no established explanation. It is theorized that changes in the crystalline character of the silver, and in some sense chemical combinations with oxygen may be involved. Still other failures of silver films to function in the normal manner after short periods of proper performance sometimes occur without any physical change concomitantly being observed.

For convenience, such properties of thin metal films which impart resistance to chemical, thermal and mechanical injury thereto, and contribute to longer operation lifetimes in an oxygen permeation system are hereinafter and in the claims collectively termed "stability."

It is therefore the general object of the present invention to provide a novel metallic film of improved stability for use as a permeation membrane in the separation of oxygen from air.

It is a more particular object to provide such aforesaid membranes formed from alloys of silver.

It is a still more particular object to provide oxygen permeable membranes formed from an alloy of silver with copper.

These and other objects which will be apparent from the specification appearing hereinafter are accomplished in accordance with the present invention by the utilization of alloys of at least 80 atom-percent and not more than 99.8 atom-percent silver with another transition metal having from 8 to 10 inclusive electrons in the outermost occupied $d$ shell thereof. Metals of this class are copper, nickel, cadmium, palladium, platinum, gold, zinc and mercury.

It has been found thin films formed from these alloys have what appears to be the unique property of substantially increased stability under oxygen permeation conditions, i.e., elevated temperature and pressure, without destroying the ability of the films to selectively permeate oxygen from the other components of air. In marked contrast, other metals, such as beryllium and aluminum, when alloyed with silver, even in relatively small amounts, have been found to prevent entirely the diffusion of oxygen through thin films.

With respect to the alloy films of the present invention, it has been further found that although all of the class constitute an improvement over substantially pure silver films for oxygen separation, not all of the individual species constitute an improvement in the same property. For example, it is preferred to employ alloys of silver and copper in which the copper is present in an amount of from 0.2 to 20 atom-percent. Throughout this range the stability of the permeation films is greatly improved, in some instances by several orders of magnitude over pure silver. For a part of this range, however, there is exhibited a slight decrease in oxygen permeation rate at a given set of temperature and pressure conditions compared with pure silver under the same conditions, but the net result of the balance between stability and permeation rate is highly favorable. For the remainder of this range, namely about 7.0 to 9.0 atom-percent copper, both oxygen permeation rates and stability are substantially improved. Although I do not wish to be bound by any particular theory, it is conceivable that the paradoxical increase in oxygen permeability at total copper concentrations between about 7.0 and 9.0 atom-percent can be attributable to the effect of a second phase on the microstructure of the permeable membrane. In Ag-Cu alloys containing only the silver rich phase, oxidation of the solute may cause the larger oxide molecules (copper oxide) to precipitate in the grain boundaries. The oxides then could be distributed along the available boundaries, thus blocking high diffusivity paths, the more oxide precipitated, the lower the oxygen permeability. In alloys containing more copper, such as 7.0 to 9.0 atom-percent, particles in the second phase, rich in copper, can form readily within the existing silver-rich grains, as well as in the boundaries. Intragranular precipitation of the excess copper could be expected to predominate because of equilibrium segregation. After oxidation, however, the particles of copper-rich phase could be expected to exert considerable mechanical stresses leading to the formation of many new grains of silver-rich phase. The slow process of oxide precipitation from the silver-rich phase should also occur, but the oxide molecules would be concentrated near the oxidized copper-rich particles very close to the newly formed boundaries. Because of the large number of new grain boundaries generated by the oxide molecules concentrated in a small number of them, a permanent increase in oxygen permeability could be obtained because many new high-diffusivity paths are available.

Preferences also exist for certain alloy compositions of silver with the other metals set forth hereinbefore. In the Ag-Ni system it is preferable that the alloy consist of silver and from about 0.2 to about 5.0 atom-percent nickel; in the Ag-Pd system, from about 0.95 to about 1.6 (especially about 1.1) atom-percent palladium; in the Ag-Pt system from about 0.91 to about 17 (especially about 2.7) atom percent platinum; and in the Ag-Au system from about 0.6 to about 3.0 (especially about 1.3) atom percent gold. Alloys of silver with zinc or mercury have been found to function advantageously when the zinc or mercury content is quite low, i.e., about 0.2 to 0.5 atom-percent.

It is not moreover, essential that the alloy contain silver and only one of the other transition metals herein before specified. Whereas there is no particular evidence of a synergestic effect resulting from the presence of two or more of these other metals in the alloy with silver, there is on the other hand no indication of any undesirable effects attributable to such presence. In general, however, where two or more of the transition metals of this invention in addition to silver are employed in forming an alloy, the total concentration of the non-silver metals should preferably not exceed the highest preferred concentration (supra) for any one of the metals involved. For example, if both nickel and platinum are employed in the alloy with silver, the total concentration of nickel and platinum should not exceed 1.6 atom-percent.

Preparation of the metal alloy permeation membranes of this invention can be accomplished by any of several well known techniques. Membranes of thicknesses of about 0.01 mil. or more are conveniently formed by conventional cold rolling techniques. Membranes of lesser thickness can be prepared by vacuum evaporation deposition, deposition by cathodic sputtering, or deposition by electroplating, or modifications of these techniques using either porous or non-porous substrates. Films deposited on appropriate porous substrates can be utilized without requiring separation from the substrate, thereby avoiding the need for handling with the attendant dangers of mechanical rupture of the delicate films.

A variety of porous substrates can be employed including plastic films and sintered metal powder sheets. We have found that commercially available porous stainless steel, while being too grossly porous for use as a substrate for direct deposition of a thin alloy film thereon, can be modified with silver powder to produce an excellent surface for film deposition. For example, using a 55 percent dense powder-form stainless steel sheet about 1/16 inch thick and having an average pore diameter of 5 microns, the following techniques for reducing the porosity thereof were found suitable (A). A thin layer of silver powder having an average particle size of about 0.9 micron is sprinkled or brushed on one surface of the porous stainless steel. The substrate is then pressed between polished steel dies in the platens of a hydraulic press using pressures of about 50,000 p.s.i. After pressing, the substrate is sintered in air at 500 to 600° C; (G) Fine silver powder is first dispersed in air by injecting a quantity of the powder and air into a previously evacuated volume and thereafter forcing the powder-air dispersion through the porous stainless steel, thereby depositing the powder at or near the surface. Pressing and sintering as in method (A) above consolidates the powder layer and provides a flat, polished surface for thin-film deposition; (C) Silver "smoke" formed in an electric arc can also be used to provide a suitably porous layer on a substrate too grossly porous for thin film metal deposition directly. Silver smoke particles of about 0.1 micron or less can readily be generated in an electric arc struck between a silver cathode and a non-consumable tungsten anode in an inert atmosphere such as nitrogen. By drawing the nitrogen atmosphere containing the silver particles through the porous substrate, the silver particles become lodged in the pores thereby effectively decreasing the pore diameters. Pressing and sintering complete the preparation of the substrate.

The porous substrates can be coated with a thin film of one of the silver alloys of this invention, as stated herein before, by electrodeposition, vacuum evaporation deposition or cathodic sputtering. A type of sputtering in which the substrate is the cathode is described in detail in a literature article by D. M. Mattox, Electrochemical Technology, vol. 2, No. 9–10, September-October, 1964.

Some of the alloys, namely those of silver with copper, platinum or gold can most conveniently be placed as thin films on a substrate by electrodeposition. The deposition of silver-copper, silver-platinum, and silver-gold alloy films using a cyanide plating bath is described in A. Brenner, Electrodeposition of Alloys, vol. 1, pp. 609–614, Academic Press, New York (1963). This publication also provides detailed disclosure of electrodeposition techniques for forming films of silver-zinc alloys from both cyanide and non-cyanide baths. These are set forth in vol. 1, pages 668–670.

Vacuum evaporation techniques for the deposition of single metal films are readily modified or adapted to the preparation of films of the alloys of this invention. Theoretical considerations and practical application of this technique are set forth in numerous literature articles, viz Moss, R. L. and D. H. Thomas, Trans, Far. Soc. vol. 60, page 1110 (1964) and S. Mader, J. Vac. Sci. Tech., vol. 2, No. 1, page 35 (1965).

The preparation of thin films for use in electronics applications has been practiced commercially for some time by means of sputtering. This operation is also useful in preparing silver-alloy permeation membranes here involved. A low energy three element sputtering system that offers substantial control over various operating parameters is described and shown pictorially in Research Development, vol. 16, No. 3, page 62 (1965), J. W. Nickerson et al.

The following examples will serve to further illustrate the practice of the present invention:

Examples 1–8

A series of silver alloys of this invention were formed, and rolled into thin films of 2 mil. thickness using conventional commercial rolling apparatus. For purposes of comparison, two pure silver films containing not more than about 0.1 atom-percent impurity were prepared in like manner. Sample discs of about 1-inch in diameter were cut from each of the films for testing their ability to withstand contact with oxygen under permeation conditions. The compositions of the alloy discs were as follows:

| Example No. | Alloying Metal | Atom, percent Alloying Metal |
|---|---|---|
| 1 | Nickel | 2.6 |
| 2 | Copper | 1.9 |
| 3 | ----do | 8.2 |
| 4 | ----do | 8.2 |
| 5 | Palladium | 1.1 |
| 6 | Platinum | 2.7 |
| 7 | Gold | 0.60 |
| 8 | ----do | 3.0 |
| Control | Normal Impurities | 0.1 |
| Do | ----do | 0.1 |

Each of the film discs were in turn placed in a gastight cell in which they served as the barrier or permeation membrane. The discs were supported on both sides in the cell by grossly porous steel substrates to avoid mechanical rupture which would otherwise result from the establishment of a large pressure differential across the membrane. The cell and disc were heated to 515° C. A vacuum was established on both sides of the disc in the cell and the apparatus and disc were permitted to outgas for about 15 hours at the elevated temperature. At the end of this period, helium was introduced into one side of the cell until a pressure of about one atmosphere had been obtained against one surface of the disc. The other half of the cell was sealed under vacuum and the pressure was monitored with a McLeod gauge to observe any transfer of helium through the disc. All of the discs tested except one of the silver control discs, which ruptured after 2½ hours contact with helium, were found to be free of pin-holes and were total barriers to the passage of helium. The helium was thereafter removed from the cell and replaced with oxygen under a pressure of 2 atmospheres at 515° C. All of the discs were found to be permeable to oxygen. The silver control disc which did not rupture under helium pressure, while permeating oxygen, did not reach a steady state. The apparent oxygen permeation rate increased from very low to very high values and then the membrane failed after 2½ hours of operation. No failure under contact with oxygen at 2 atmospheres and 515° C. was observed for the remaining alloy discs at the times indicated below.

| Example | No structural failure at: hours |
|---|---|
| 1 | 116 |
| 2 | 201 |
| 3 | 31 |
| 4 | 72 |
| 5 | 145½ |
| 6 | 244 |
| 7 | 140 |
| 8 | 30 |

Under testing conditions identical to those employed in Examples 1 through 8, the following results were obtained using alloy discs of identical dimensions and method of formation as therein.

| Alloying Metal | Alloying Metal Concentration (atom, percent) | Oxygen Contact Time (hours) | Results—Temperature =515° C., Oxygen pressure=2 atm. |
|---|---|---|---|
| Beryllium | 8.9 | 55 | No permeation detected. |
| Aluminum | 4.0 | 46 | Do. |
| Copper | 40.4 | 24 | Do. |
| Do | 52.5 | 28 | Do. |
| Palladium | 23.9 | 24 | Do. |
| Gold | 100 | 22 | Do. |

What is claimed is:
1. In the process for separating oxygen from air in which air at elevated temperature is brought into pressure contact with one surface of a thin metallic membrane while maintaining a substantially lower pressure on the converse side of the said membrane, whereby oxygen selectively permeates through the said membrane, the improvement which comprises employing as the metal permeation membrane a thin film of an alloy consisting of at least 80 atom-percent silver and not greater than 99.8 atom-percent silver with at least one other transition metal having from 8 to 10 inclusive electrons in the outermost occupied $d$ shell thereof.

2. Process according to claim 1 wherein the permeation membrane is formed from an alloy consisting of from between 80 atom-percent and 99.8 atom-percent silver and from 0.2 atom-percent to 20 atom-percent copper.

3. Process according to claim 2 wherein the permeation membrane is formed from an alloy consisting of from about 7 to 9 atom-percent copper and 93 to 91 atom-percent silver.

4. Process according to claim 1 wherein the permeation membrane is formed from an alloy consisting of from 99.8 atom-percent to about 95 atom-percent silver and from about 0.2 atom-percent to 5 atom-percent nickel.

5. Process according to claim 1 wherein the permeation membrane is formed from an alloy consisting of from about 99.05 atom-percent to 98.4 atom-percent silver and from about 0.95 atom-percent to 1.6 atom-percent palladium.

6. Process according to claim 5 wherein the palladium content of the alloy is about 1.1 atom-percent.

7. Process according to claim 1 wherein the permeation membrane is formed from an alloy consisting of from about 1.0 atom-percent to about 17 atom-percent platinum and from about 99 atom-percent to 83 atom-percent silver.

References Cited

UNITED STATES PATENTS 3,155,467   11/1964   Musashino-shi _____ 55—16

FOREIGN PATENTS 526,034   5/1955   Italy.

OTHER REFERENCES

Johnson et al., The Diffusion of Oxygen Through Silver, a Contribution from the Chemical Laboratory of McGill University, June 1924, vol. 46, pp. 1377–1379.

REUBEN FRIEDMAN, *Primary Examiner.*

J. ADEE, *Assistant Examiner.*